US005337878A

United States Patent [19]

Mehlert et al.

[11] Patent Number: 5,337,878

[45] Date of Patent: Aug. 16, 1994

[54] ASSEMBLY AND METHOD FOR ADJUSTING BRAKE FORCE FOR PASSENGER CONVEYOR EMERGENCY BRAKE

[75] Inventors: Martin Mehlert, Nienstaedt; Hans E. Engel, Apelern, both of Fed. Rep. of Germany

[73] Assignee: Otis Elevator Company, Farmington, Conn.

[21] Appl. No.: 174,115

[22] Filed: Dec. 28, 1993

[51] Int. Cl.[5] ........ B65G 43/00

[52] U.S. Cl. ........ 198/323; 188/171; 188/75

[58] Field of Search ........ 198/322, 323, 330; 188/134, 171, 135, 75

[56] References Cited

U.S. PATENT DOCUMENTS

| | | | |
|---|---|---|---|
| 3,830,344 | 8/1974 | Cervenec et al. | 188/171 |
| 3,866,725 | 2/1975 | Greutter | 198/323 X |
| 3,896,925 | 7/1975 | Mitsui et al. | 198/323 |
| 3,927,738 | 12/1975 | Ernst | 198/323 X |
| 4,023,655 | 5/1977 | Anzai et al. | 188/171 |
| 4,031,987 | 6/1977 | Webb | 188/171 X |
| 4,033,434 | 7/1977 | Henrich | 188/171 X |
| 4,588,065 | 5/1986 | Maiden et al. | 198/323 |
| 4,664,247 | 5/1987 | Wolf et al. | 198/323 |
| 4,717,865 | 1/1988 | Caputo | 188/171 X |
| 4,875,558 | 10/1989 | Berkhan et al. | 188/171 |

FOREIGN PATENT DOCUMENTS

| | | | |
|---|---|---|---|
| 3106793 | 5/1991 | Japan | 198/323 |

*Primary Examiner*—D. Glenn Dayoan

[57] ABSTRACT

The emergency brake for a passenger conveyor such as an escalator or moving walkway is provided with a brake force adjustment assembly which will supply a braking force that is proportional to the passenger load imposed on the main drive motor of the conveyor at any point in time. Thus, if the conveyor is lightly or heavily loaded with passengers, the emergency brake force will be automatically proportionally decreased or increased so that, in the event of an emergency stop condition, the braking force applied to the drive sprocket axle will be sufficient to stop movement of the conveyor within the predetermined time period that is preprogrammed into the conveyor controller.

7 Claims, 2 Drawing Sheets

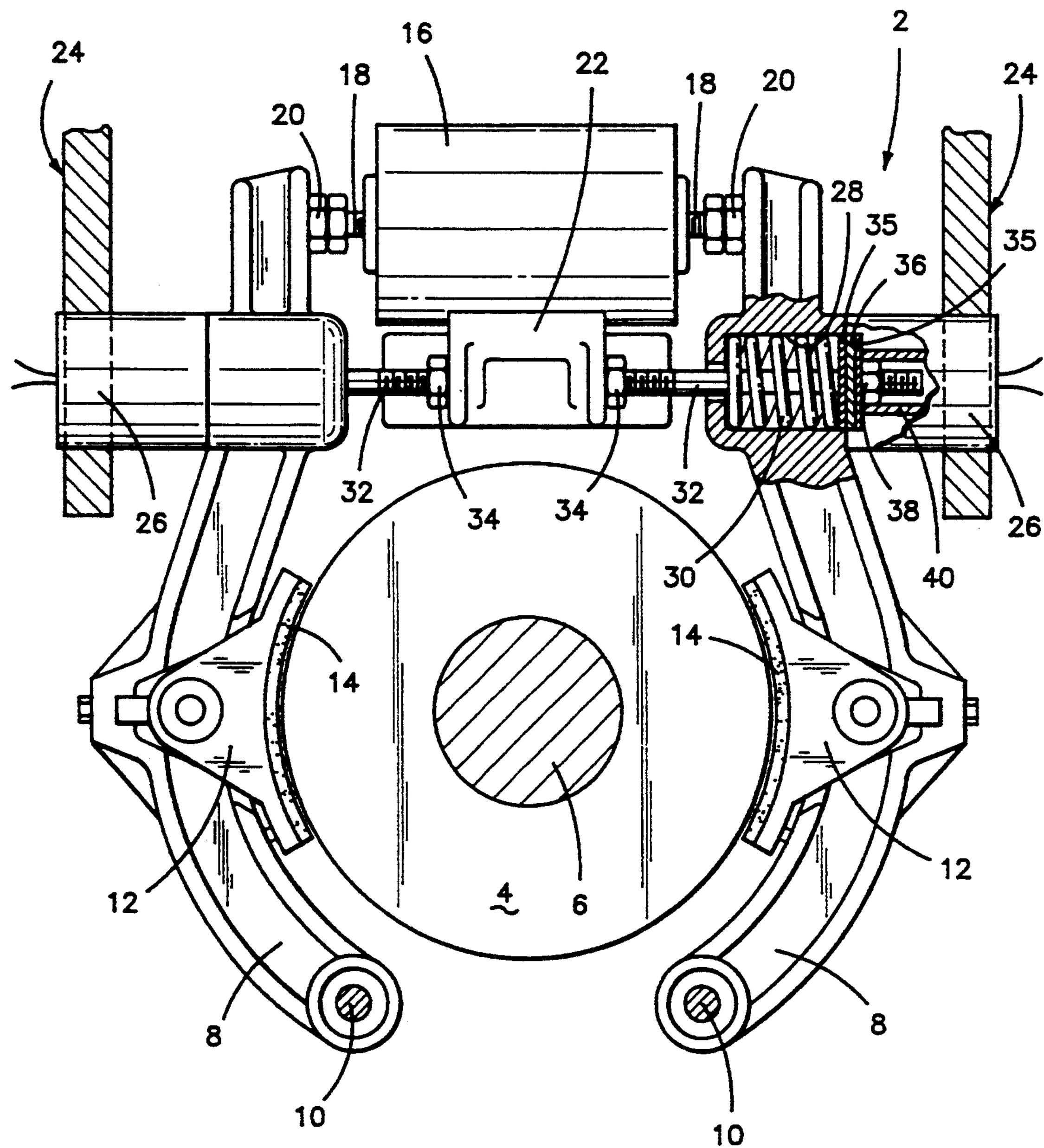
FIG—1

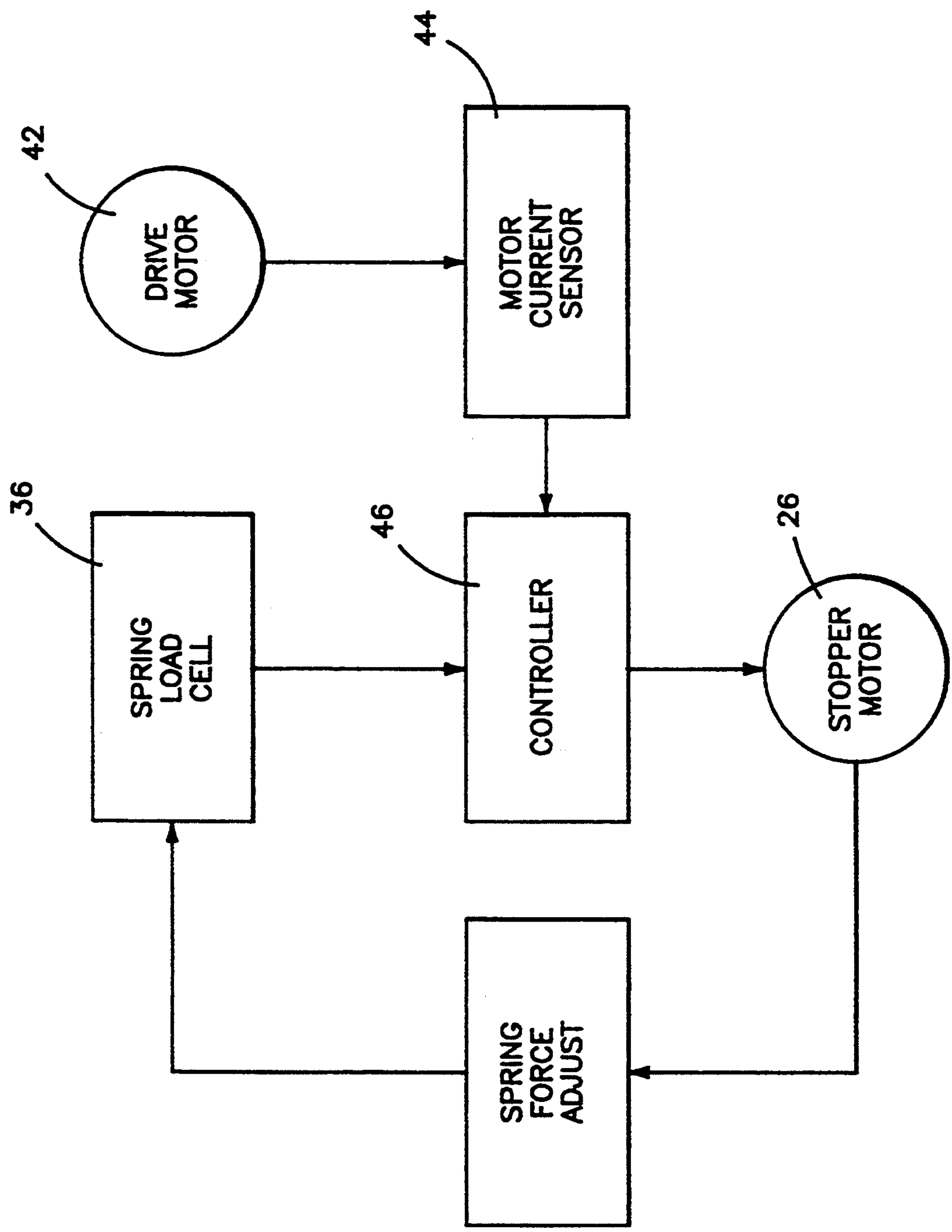
FIG—2

ASSEMBLY AND METHOD FOR ADJUSTING BRAKE FORCE FOR PASSENGER CONVEYOR EMERGENCY BRAKE

TECHNICAL FIELD

This invention relates to a passenger conveyor system such as an elevator, escalator, or moving walkway, and more particularly to an emergency braking assembly which provides a braking force that is proportional to the passenger load at any particular time.

BACKGROUND ART

Passenger conveyors such as escalators and moving walkways are provided with emergency braking systems which will stop movement of the conveyor steps or treads and of the handrail in the event of an emergency condition. An emergency condition can include intrusion of a foreign object in the handrail reentry housing; intrusion of a foreign object between a step or tread and the exit landing comb plate; failure of a component of the conveyor; or the like.

When an emergency condition occurs, the conveyor microprocessor controller is preprogrammed to stop further movement of the conveyor, and also to complete the stopping of the conveyor within a predetermined time period which will provide a comfortable cessation of conveyor movement for the passengers on the conveyor, while at the same time minimize the duration of the emergency condition. The time needed to stop movement of the conveyor is inversely proportional to the braking force applied to the drive sprocket axle, thus, all things being equal, the escalator will stop quicker if a greater braking force is applied. The problem encountered with emergency braking is that one cannot predict how much braking force will have to be applied to the conveyor to stop within the predetermined time period because one cannot know how many passengers will be on the conveyor when an emergency situation arises. Thus, one must set the braking force at some passenger load value. This can result in an unduly abrupt cessation of conveyor movement when the conveyor is lightly loaded. Thus, it would be desirable to have a system which will periodically adjust the emergency braking force to be applied to the drive sprocket axle to reflect the currently existing passenger load on the conveyor.

DISCLOSURE OF THE INVENTION

This invention relates to a system and method for periodically adjusting the emergency brake force, either upwardly or downwardly, in response to ongoing changes in passenger-induced load on the conveyor.

The emergency brake will typically include a brake drum or brake disc fixed to the drive sprocket or sheave shaft, which shaft is, in turn, powered by the main drive motor. Brake shoes are mounted on lever arms which are pivotally disposed adjacent to the brake disc or drum, for selective brake shoe engagement with the latter when the conveyor is subjected to an emergency stop. The lever arms are spring biased toward a brake drum/disc-engaging position; and a solenoid assembly is operably connected to the lever arms so as to normally hold the lever arms away from the drum/disc-engaging position, and against the bias of lever arm springs.

The system includes a conveyor main drive motor current sensor that monitors the current being drawn by the main drive motor as the conveyor carries passengers. The current drawn by the drive motor will vary proportionally with the load imposed on the conveyor. The conveyor load will be generally proportional to the number of passengers on the conveyor.

The system also may include a lever arm spring position sensor or compression load cell which will monitor the braking force that is being exerted on the brake shoe lever arms. Both the drive motor current sensor and the spring braking force monitors are operably connected to a conveyor controller microprocessor which constantly receives ongoing current and brake force magnitude signals whereby the controller is able to monitor emergency braking parameters which will be needed to provide the proper time delay for braking the conveyor in the event of an emergency. The controller microprocessor is preprogrammed with a table of brake spring load values which correspond to preprogrammed passenger loads so that the controller can select a brake spring load value that will ensure the proper braking time period for the existent passenger load under all operating conditions. As previously noted, brake spring load signals may be transmitted to the controller by the load cell; and passenger load signals will be transmitted to the controller by the drive motor current sensor. The controller will thus have two operating condition inputs that it will use to ensure the proper emergency braking time period.

The emergency brake is provided with a threaded brake spring guide rod which carries a compression washer; an adjustment nut that bears against the compression washer; and a reversible stepping motor operably connected to the adjustment nut. Operation of the stepping motor is regulated by the conveyor controller so that the controller will cause the stepping motor to selectively change the position of the adjustment nut so as to provide the proper brake spring compression force needed to properly stop the conveyor in the event of an emergency situation.

It is therefore an object of this invention to provide a passenger conveyor emergency brake assembly which provides a conveyor braking force which is proportional to the passenger load on the conveyor.

It is a further object of this invention to provide a brake assembly of the character described which ensures a target conveyor braking time that is proportional to the passenger load on the conveyor so that the emergency will be timely alleviated and passengers will not be exposed to a harsh braking experience.

These and other objects and advantages of the invention will become more readily apparent from the following detailed description of a preferred embodiment of the invention when taken in conjunction with the accompanying drawings, in which:

BRIEF DESCRIPTION OF THE DRAWINGS

FIG. 1 is a somewhat schematic front elevational view, shown partly in section of an escalator emergency brake assembly which includes a brake force adjustment assembly which operates in accordance with this invention; and FIG. 2 is a schematic view of the brake force adjustment system which controls the assembly of FIG. 1.

BEST MODE FOR CARRYING OUT THE INVENTION

Referring now to FIG. 1, there is shown an embodiment of an escalator brake assembly denoted generally by the numeral 2 which incorporates a brake force adjustment mechanism that automatically adjusts the emergency braking force in response to sensed passenger load. The brake assembly 2 includes a brake disc or drum 4 that is keyed to the step chain drive shaft 6 which is powered by a conventional escalator drive motor (not shown). A pair of brake levers 8 are pivotally mounted on shafts 10 on either side of the brake disc 4. Brake shoes 12 are pivotally mounted on the brake levers 8, and carry brake pads 14 which are applied to the brake disc 4 to stop rotation of the drive shaft 6 in emergency situations.

During normal operating conditions, the brake pads 14 are held out of engagement with the brake disc 4 by a solenoid 16 when the escalator operates in its normal fashion, either continuously running, in the American fashion, or only running when occupied by passengers, in the European fashion. In either case, the emergency brake assembly 2 will be disabled by the solenoid 16 from stopping the escalator unless an emergency situation occurs. The solenoid 16 includes a pair of plungers 18 which engage the brake levers 8 so as to hold the latter away from the brake disc 4. Adjustment nuts 20 are threaded onto the plungers 18 and are used to finely adjust the pivotal position of the levers 8. The solenoid 16 is mounted on a bracket 22 that is fixed to a part of the escalator truss 24.

A pair or reversible electric motors 26 are secured to the escalator truss 24 so as to be positively fixed relative to the truss 24. Each of the levers 8 includes a well 28 in which a brake force governing spring 30 is disposed. The springs 28 are mounted on spring guide rods 32 which are adjustably threaded into the bracket 22 and held in place by lock nuts 34 that are threaded onto the guide rods 32. The springs 28 are compressed by washers 35 and load cells 36 which are movably mounted on the guide rods 32. Spring pressure adjustment nuts 38 are threaded onto the guide rods 32, and they bear against the washers 35 which in turn bear against the load cells 36. The washer 35 and load cells 36 are sized so as to be able to telescope into the wells 28, if necessary. The spring pressure adjustment nuts 38 are engaged by chucks 40 which are reversibly driven by the reversible electric motors 26. The motors 26 can rotate the nuts 38 in either direction on the rods 32 so as to compress or release the springs 30 so that the braking force applied to the levers 8 can be increased or decreased. The load cells 36 measure the existing pressure being applied by the springs 30 on them and therefore, the existing braking force which is applied by the springs 30 to the levers 8. The existing emergency braking force is thus constantly monitored and identified.

Referring to FIG. 2, a schematic diagram of the control system incorporated into the brake assembly is shown. The escalator drive motor, denoted by the numeral 42, has its drive current constantly monitored by a current sensor 44 which transmits drive current-proportional signals to the escalator controller 46. The drive current will vary proportionally to the passenger-induced load on the drive motor 42. The signals transmitted to the controller 46 by the sensor 44 are thus indicative of the number of passengers on the escalator at any given time. The controller 46 operates the stepper motors 26 in accordance with the signals from the current sensor 44 to increase or decrease the brake spring compression, as needed. Adjustments in the spring force are measured by the load cells 36 which transmit signals to the controller 46 representing the existing brake spring force. The controller 46 is preprogrammed with target brake force/passenger load data so as to be able to correlate target load cell signals with various passenger load signals. The controller 46 will continue to adjust the braking force whenever load cell signals indicate that such is necessary to achieve a breaking force that is favorable to achieving the target stopping period in an emergency situation. The escalator braking force is thus always suitable for properly and safely stopping the escalator under varying passenger load conditions.

Instead of using a load cell to monitor spring compression, one could use a position sensor to locate the end of the brake springs influenced by the motors. It will be noted that the brake assembly of this invention could be used with a moving walkway, or with an elevator if desired. The brake shoes in the brake assembly could be configured to engage the sides of a brake disc rather than the circumference, if so desired.

Since many changes and variations of the disclosed embodiment of the invention may be made without departing from the inventive concept, it is not intended to limit the invention otherwise than as required by the appended claims.

What is claimed is:

1. An emergency brake assembly for use in a passenger conveyor system having a main drive electric motor for supplying motive power to the conveyor system, said brake assembly comprising:

a) disc/drum means keyed to a main power shaft which is rotated by said drive motor;

b) brake arm/shoe assemblies associated with said disc/drum means and movable between braking positions wherein said power shaft is disabled from supplying motive power to the conveyor system, and non-braking positions wherein said power shaft is able to supply motive power to the conveyor system;

c) spring means operable to apply a spring force to said brake arm/shoe assemblies to bias the latter toward said braking positions;

d) retention means operable to hold said brake arm/shoe assemblies in said non-braking positions;

e) a controller for selectively operating said brake assembly;

f) force adjusting means operably connected to said spring means, said force adjusting mass being operable to act on said spring means to selectively increase and decrease said spring force, said force adjusting means being connected to and regulated by said controller;

g) current sensor means for sensing current required by said main drive motor to operate the conveyor system at any particular time, said current sensor means being connected to said controller and operable to transmit conveyor passenger load signals to said controller which are derived from ongoing drive motor current requirements; and h) said controller being operable to manipulate said force adjusting means in response to changes in said passenger load signals during passenger conveying operation of the conveyor system.

2. The brake assembly of claim 1 wherein said force adjusting means comprises reciprocating means engaging an end of said spring means and operable to selectively compress or relax said spring means.

3. The brake assembly of claim 2 further comprising a reversible electric motor connected to said reciprocating means, and operated by said controller.

4. The brake assembly of claim 1 further comprising means for sensing forces imposed on said brake arm/shoe assemblies by said spring means, said means for sensing being connected to said controller and operable to transmit existing spring forces to said controller during passenger conveying operation of the conveyor system.

5. A method for providing a variable emergency braking force to a passenger conveying system of the type having an electric main drive motor which powers a main drive shaft having a spring-biased braking assembly associated therewith, said method comprising the steps of:

a) sensing current to said electric main drive motor during normal passenger conveying periods of operation; and b) adjusting said spring-biased braking assembly in response to sensed main drive motor current to increase and decrease the braking force of said braking assembly as said motor current increases and decreases in order to enable said braking assembly to stop the conveyor system in substantially the same predetermined time period during emergency conditions irrespective of existing passenger load on the conveyor system.

6. The method of claim 5 comprising the further step of continuously sensing the existing braking force of said braking assembly to ensure the existence of an appropriate braking force needed to achieve the predetermined emergency stop time period in view of the coexisting sensed main drive motor current.

7. The method of claim 6 comprising the further steps of continuously electronically comparing coexisting sensed braking forces and sensed main drive motor current; and further adjusting said braking assembly when necessary in order to obtain a favorable braking force and motor current comparison which will assure achievement of said predetermined emergency time period.

* * * * *